United States Patent
Nishi et al.

(10) Patent No.: US 11,222,535 B2
(45) Date of Patent: Jan. 11, 2022

(54) ROUTE DETERMINATION METHOD, CONTROLLER, AND ROUTING SYSTEM COMPRISING CONTROLLER

(71) Applicants: MURATA MACHINERY, LTD., Kyoto (JP); OSAKA UNIVERSITY, Suita (JP)

(72) Inventors: Tatsushi Nishi, Suita (JP); Kosei Nishida, Suita (JP); Hideki Kaname, Kyoto (JP); Kenji Kumagai, Inuyama (JP); Toshimitsu Higashi, Inuyama (JP)

(73) Assignees: MURATA MACHINERY, LTD., Kyoto (JP); OSAKA UNIVERSITY, Osaka (JP)

( * ) Notice: Subject to any disclaimer, the term of this patent is extended or adjusted under 35 U.S.C. 154(b) by 102 days.

(21) Appl. No.: 16/881,230

(22) Filed: May 22, 2020

(65) Prior Publication Data

US 2020/0372797 A1    Nov. 26, 2020

(30) Foreign Application Priority Data

May 22, 2019   (JP) .............................. JP2019-095742

(51) Int. Cl.
*G08G 1/123* (2006.01)
*G01C 21/34* (2006.01)
*B60W 60/00* (2020.01)

(52) U.S. Cl.
CPC ......... *G08G 1/123* (2013.01); *B60W 60/0025* (2020.02); *G01C 21/3407* (2013.01); *G01C 21/3446* (2013.01); *G01C 21/3453* (2013.01)

(58) Field of Classification Search
None
See application file for complete search history.

(56) References Cited

U.S. PATENT DOCUMENTS

2009/0193235 A1    7/2009  Hayashi et al.
2011/0251789 A1*  10/2011  Sanders ................. G06Q 10/08
                                                       701/533

(Continued)

OTHER PUBLICATIONS

Daugherty, Reveliotis, Mohler, "Optimized Multiagent Routing for a Class of Guidepath-Based Transport Systems", 2018, IEEE. (Year: 2018).*

(Continued)

*Primary Examiner* — Khoi H Tran
*Assistant Examiner* — Tristan J Greiner
(74) *Attorney, Agent, or Firm* — Keating & Bennett, LLP (57) ABSTRACT

A time-space network including a set of state nodes and a set of state transition edges each of which connects between the state nodes, is generated. Each of the state nodes represents a state in which a vehicle is present at a certain point node at a certain time. State transition costs increasing according to a difference of time corresponding to before or after transition and arrival time are defined. In the time-space network, by using the Dijkstra algorithm, a minimum cost transition path in which a sum of the state transition costs is minimum among paths from a starting point state node to any of the state nodes indicating that the vehicle is present at an arrival point is obtained. The starting point state node represents a state that the vehicle is present at a departure point at a reference time. The route and the timing of the vehicle are determined based on the minimum cost transition path.

8 Claims, 6 Drawing Sheets

(56) References Cited

U.S. PATENT DOCUMENTS

2013/0304378 A1* 11/2013 Graells ............. G01C 21/3423
701/533
2020/0117220 A1* 4/2020 Paglieroni ............ G08G 5/0013

OTHER PUBLICATIONS

Fazlollahtabar, Saidi-Mehrabad, Balakrishnan, "Mathematical Optimization for earliness/tardiness minimization in a multiple automated guided vehicle manufacturing system via integrated heuristic algorithms" 2015, Robotics and Autonomous Systems 72, 131-138. (Year: 2015).*

* cited by examiner

ROUTE DETERMINATION METHOD, CONTROLLER, AND ROUTING SYSTEM COMPRISING CONTROLLER

CROSS-REFERENCE TO RELATED APPLICATIONS

This application claims the benefit of priority to Japanese Patent Application No. 2019-095742 filed on May 22, 2019. The entire contents of this application are hereby incorporated herein by reference.

BACKGROUND OF THE INVENTION

1. Field of the Invention

At least one preferred embodiment of the present invention relates to the determination of routing and timing for automated guided vehicles to perform automatic travel.

2. Description of the Related Art

For example, in transport systems such as semiconductor manufacturing plants, in order to improve efficiency and productivity of semiconductors and processing devices, etc., JIT (Just In Time) performance is required to deliver materials just in time to be delivered in time for a designated time. Japanese Patent No. 4,782,194 discloses a routing method used in this type of transport system.

In the routing method used in the transport system of Japanese Patent No. 4,782,194, a schedule of transport scenarios is generated. When a deviation from the predefined schedule occurs, a rerouting is carried out so as to realize JIT transport.

In the configuration of Japanese Patent No. 4,782,194, for example, in a large semiconductor manufacturing plant or the like, in which the number of vehicles is several tens to hundreds, or thousands, it is required to generate the schedule so that each of the vehicles does not interfere with a large number of the other vehicles during traveling. Therefore, the efficiency of the schedule is low, and there is a high possibility that JIT transport is not realized.

SUMMARY OF THE INVENTION

Preferred embodiments of the present invention determine routing and timing of vehicles having good JIT performance with good efficiency.

A first preferred embodiment of the present invention provides a determination method of routing for automated guided vehicles, in which a route and timing of a vehicle that performs automatic traveling are determined. In the method, a first graph is prepared. The first graph represents the routes along which the vehicle can travel. The first graph includes a set of point nodes, and inter-point edges in each of which connects between the point nodes. Each of a departure point node, which is a departure point of the vehicle, and an arrival point node, which is an arrival point of the vehicle, can be selected from the point nodes in the first graph. When a departure time at which the vehicle is to depart from the departure point node and arrival time at which the vehicle is to arrive at the arrival point node are designated respectively, a second graph is generated. The second graph represents a procedure for the vehicle traveling from the departure point node to the arrival point node. The second graph includes a set of state nodes, and a set of state transition edges connected between the state nodes. Each of the state nodes represents a state in which the vehicle is present at a certain point node at a certain time. Each of the state transition edges connects between the state nodes. The state transition edges include a vehicle staying edge and a vehicle traveling edge. The vehicle staying edge represents that the vehicle present at a certain point node at a certain time stays at the certain point node until a later time. The vehicle traveling edge indicates that the vehicle present at a certain point node at a certain time travels to each of the other point nodes connected to the certain point node via the inter-point edge at a later time. The vehicle traveling edge is defined for each of the point nodes of destination. It is presupposed that the state node representing a state in which the vehicle is present at the departure point node at a reference time is called a starting point state node, the second graph is generated originating from the starting point state node. In each of the state transition edges, a state transition cost is defined. The state transition cost increases according to a difference of time before or after a transition indicated by the state transition edge and the arrival time. In the second graph, by using the Dijkstra algorithm, a minimum cost path is obtained. The minimum cost path is the path in which a sum of the state transition costs is minimum among the paths from the starting point state node to any of the state nodes indicating that the vehicle is present at the arrival point node. The route and the timing of the vehicle are determined based on the minimum cost path.

As a result, it is possible to efficiently obtain the minimum cost path for travel of the vehicle from the designated departure point to the arrival point. Additionally, the state transition cost in the state transition edge is set according to a time difference corresponding to before or after the transition indicated by the state transition edge and the arrival time. Therefore, it is possible to generate a minimum cost path considering the JIT performance so that the vehicle arrives at the designated point at the designated time.

In the routing determination method, it is preferable to perform the following. The state transition cost is set to be larger when the time corresponding to before or after the transition indicated by the state transition edge is later than the arrival time than when it is earlier, even if the time difference is the same.

As a result, it is possible to greatly reduce the possibility that a path to arrive at the arrival point at a time later than the designated time is determined as the minimum cost path.

In the routing determination method, it is preferable to perform the following procedure. The state transition cost is obtained based on the total cost including an earliness cost, a tardiness cost, and a staying cost. The earliness cost is added if the time corresponding to before or after the transition indicated by the corresponding state transition edge is earlier than the arrival time. The tardiness cost is added if the time corresponding to before or after the transition indicated by the corresponding state transition edge is later than the arrival time. The staying cost is added when the vehicle stays at any of the point nodes. Each of the first parameter for weighting the earliness cost, a second parameter for weighting the tardiness cost, and a third parameter for weighting the staying cost can be specified.

By appropriately specifying the first parameter, the second parameter, and the third parameter, it is possible to determine a traveling schedule corresponding to the degree of importance with respect to the JIT performance and the transport efficiency respectively.

In the routing determination method, it is preferable that a distance between real points represented by the point nodes corresponds to a travel distance of per unit time of the vehicle.

As a result, the computation of the state transition cost can be facilitated.

In the routing determination method, it is preferable to perform the following. The route and the timing are simultaneously determined by obtaining the minimum cost path for each of a set of the vehicles in which each of the departure point node, the arrival point node, the departure time, and the arrival time are designated. If interference occurs between the vehicles in a case where each of the vehicles travels in accordance with the route and the timing, the route and the timing are determined again by re-obtaining the minimum cost path. The minimum cost path is re-obtained after increasing the state transition cost of the state transition edge corresponding to the interference.

As a result, the collision avoidance is able to be easily determined while considering the JIT performance.

In the routing determination method, it is preferable to perform the following. In the method for obtaining the minimum cost path, an iteration is repeated after an initial step. In the initial step, in the second graph, the starting point state node is set to a fixed node and a fixed cost of the starting point state node is set to a predetermined value. The iteration includes a first step, a second step, a third step, and a fourth step. In the first step, neighbor state nodes are obtained. Each of the neighbor state nodes is a state node which is not set to a fixed node, is adjacent to any fixed node, and is connected to the fixed node via the state transition edge. In the second step, with respect to specific neighbor state nodes, the state transition cost cumulative values for reaching the neighbor state nodes are obtained. The specific neighbor state nodes are neighbor state nodes, each of which is adjacent to a new-fixed node and is connected to the new-fixed node via the state transition edge. The new-fixed node is a node that has newly become the fixed node in the initial step or in the previous iteration. The state transition cost cumulative value is obtained by adding the cost of the state transition edge to the fixed cost of the new-fixed node. In the third step, with respect to each of the neighbor state nodes, a state transition cost cumulative best value is obtained. The state transition cost cumulative best value is the state transition cost cumulative value that is best among the state transition cost cumulative values obtained by the second step in the iteration from the first time to the present. In the fourth step, the neighbor state node with the smallest state transition cost cumulative best value obtained by the third step is set to the fixed node, and the state transition cost cumulative best value is set to the fixed cost of the fixed node. The fixed node and the fixed cost are sequentially obtained by repeating the iteration. A path in which the fixed cost is the smallest among the paths reaching the state node indicating that the vehicle is present at the arrival point node is obtained as the minimum cost path.

As a result, the minimum cost path can be searched efficiently. Additionally, for example, a traveling schedule that takes into account the balance between just-in-time performance and the total completion time, which are usually in a trade-off relationship, are able to be determined.

A second preferred embodiment of the present invention provides a controller having the following configuration. The controller determines the route and the timing of the vehicle using the routing determination method.

As a result, it is possible to determine efficiently the route and the timing suitable for JIT performance. This effect is particularly suitable in a transport system of a large-scale plant, a large automatic stocker, and the like, having a large number of the vehicles.

A third preferred embodiment of the present invention provides a routing system having the following configuration. The transport system includes the controller and a plurality of traveling devices. A plurality of the traveling devices perform automatic routing according to the route and the timing determined by the controller.

As a result, it is possible to efficiently determine the route and the timing with respect to a plurality of the travel devices. Thus, the overall efficiency of the transport system is able to be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
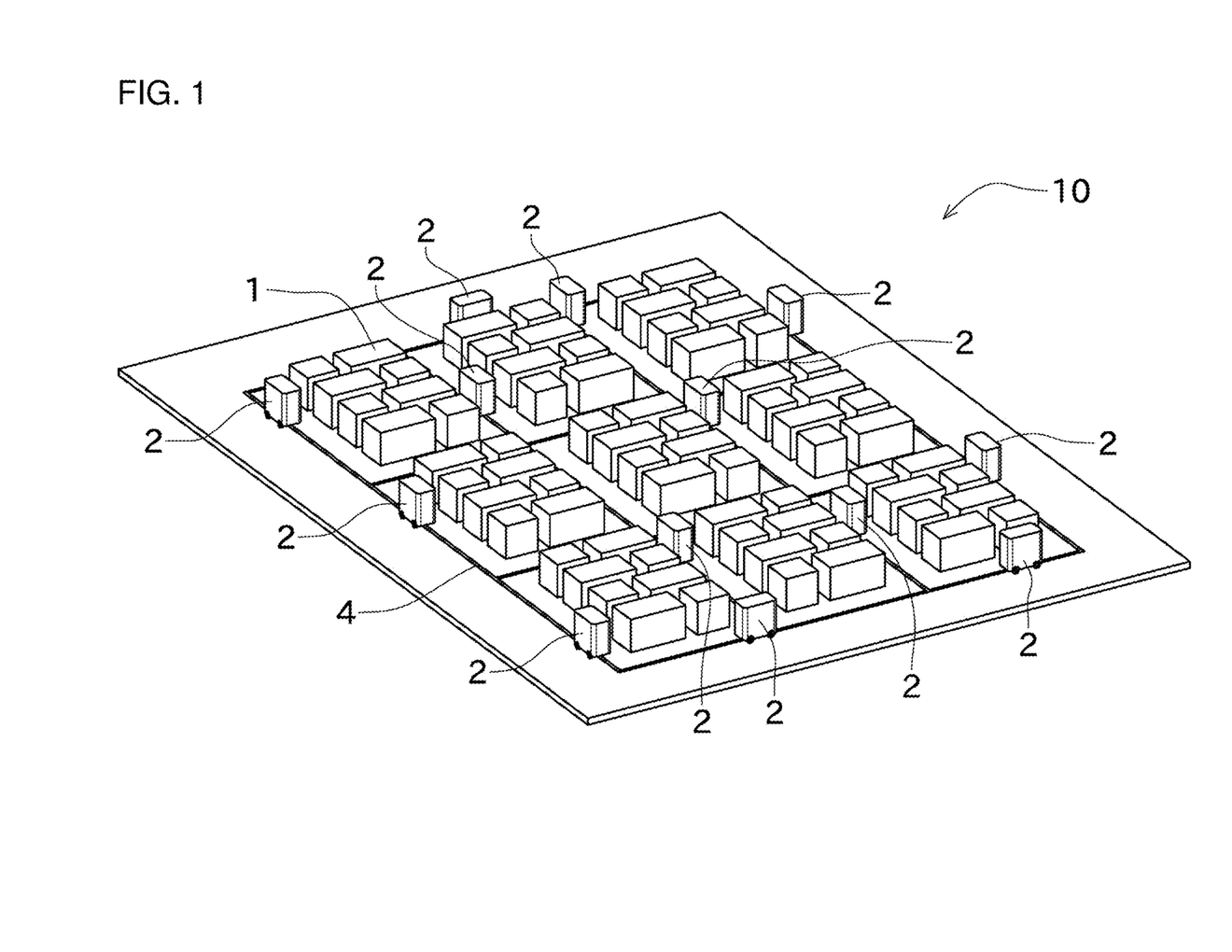
FIG. 1 is a schematic view showing a configuration of a plant using a transport system according to a preferred embodiment of the present invention.

Next, preferred embodiments of the present invention will be described with reference to the drawings. FIG. 1 is a schematic view showing a plant 10 using a transport system 100 according to a preferred embodiment of the present invention.

Figure 2:
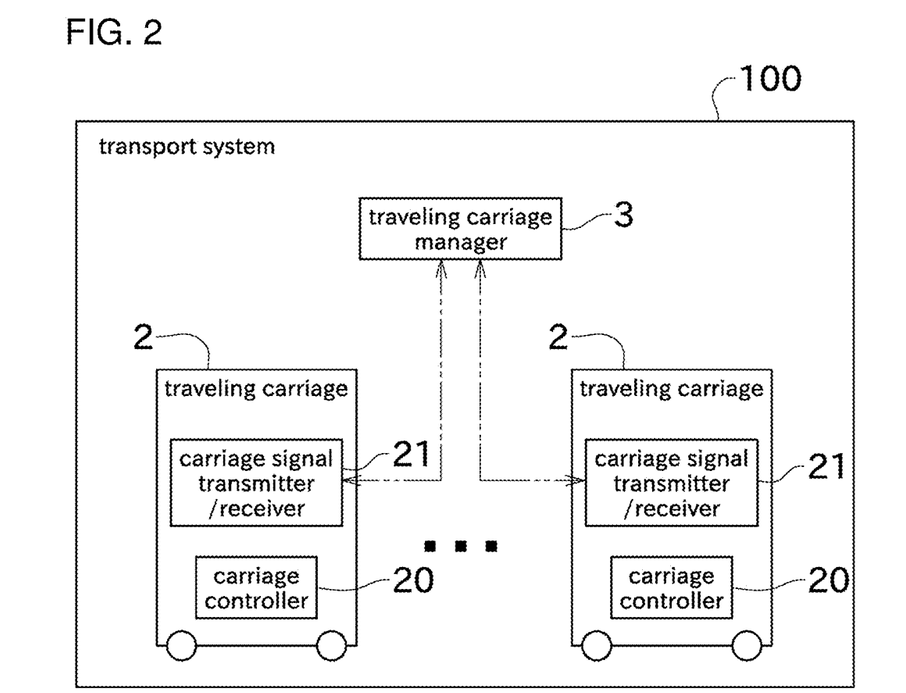
FIG. 2 is a block diagram showing a configuration of the transport system of FIG. 1.

The transport system (traveling system) 100 according to a preferred embodiment of the present invention, for example, as shown in FIG. 1, is provided in a semiconductor manufacturing plant 10 or the like having a plurality of processing devices 1. The transport system 100 is an automatic transport system for transporting the material such as FOUP (Front Opening Unify Pod) or the like. The transport system 100 includes a set of traveling carriages (vehicles as traveling devices) 2 and a traveling carriage manager (controller) 3, as shown in FIG. 2.

The processing device 1 is a device that performs various processes to produce semiconductors. The plant 10 having the transport system 100 is provided with a variety of facilities in place of the processing device 1 or in addition to the processing device 1. For example, a storage device, such as an automatic stocker, a stacker rack, or the like, can be placed. The automatic stocker can store a plurality of FOUP. In the stacker rack, a large number of storage spaces capable of storing loads such as parts or materials are provided.

The traveling carriage 2 is a transport device that travels along rails 4 to transport a load or loads automatically between the processing devices 1. The rails 4 are made of, for example, a guiding tape such as magnetic tape or the like, or a bar code or the like, attached to the floor surface. The rails 4 may be a guide provided on at least one of the traveling carriage 2 side and the rails 4 side so that running wheels (not shown) of the traveling carriage 2 run along the rails 4. Further, the rail 4 may be, for example, a guide or the like which is suspended from the ceiling of the plant 10.

The traveling carriage 2 is provided with a polyarticular robotic arm or the like (not shown). The robotic arm can perform loading and unloading. As the traveling carriage 2, for example, AGV (Automated Guided Vehicle) or OHT (Overhead Hoist Transfer) can be used.

Each of the traveling carriages 2 performs automatic travel according to a traveling schedule based on a transport task allocated by a traveling carriage manager 3. The traveling carriage manager 3 will be described later. Specifically, the traveling carriage 2 transports a designated load from a designated loading portion P1 to an designated unloading position P2. The automatic travel includes a pause for collision avoidance, and the like.

The transport task is a transport order for transporting designated load, obtained by loading at a designated loading position P1, to the designated unloading position P2. In other words, the transport task includes a position information of the designated loading P1 and the designated unloading position P2, and the like. In addition, the transport task may include an identification information of the load (designated load) as a subject for transporting from the designated loading position P1 to the designated unloading position P2.

In addition to the above, the transport task of this preferred embodiment includes a first designated time and a second designated time. The first designated time is a time specified with respect to the traveling carriage 2 as a time to arrive at the designated loading position P1. The second designated time is a time specified with respect to the traveling carriage 2 as a time to arrive at the designated unloading position P2. In this specification, the second designated time $T_{set}$ may be referred to as an arrival time.

The traveling schedule is a schedule with respect to a route and a timing in automatic travel of the traveling carriage 2. The traveling schedule is developed as the traveling carriage manager 3 allocates the transport task to the traveling carriage (or attempts to allocate).

The traveling carriage 2 includes a carriage controller 20 and a carriage signal transmitter/receiver 21, as shown in FIG. 2.

The carriage controller 20 may be or include a known computer. The carriage controller 20 includes a CPU (Central Processing Unit), a ROM (Read Only Memory), a RAM (Random Access Memory), an HDD (Hard Disk Drive), and the like, which are not shown.

The carriage controller 20 controls a load transfer operation, automatic travel, and the like. The load transfer operation is performed by a transfer mechanism such as a polyarticular robotic arm or hoist (not shown) provided with the traveling carriage 2. Automatic travel is performed by travel mechanism (not shown) provided with the traveling carriage 2.

The carriage signal transmitter/receiver 21 is configured to enable radio communication with the traveling carriage manager 3. Any radio communication method can be used. For example, a wireless LAN can be used. The carriage signal transmitter/receiver 21 can transmit self-position of the traveling carriage 2 to the traveling carriage manager 3 by radio communication. The carriage signal transmitter/receiver 21 can also receive the transport task allocated, and related information corresponding to the transport task, or the like. As the radio communication method, communication using leakage feeder wire or leakage coaxial cable can also be used.

The traveling carriage manager 3 may be or include, for example, similarly to the carriage controller 20 described above, a known computer. The traveling carriage manager 3 includes a CPU (Central Processing Unit), a ROM (Read Only Memory), a RAM (Random Access Memory), an HDD (Hard Disk Drive), and the like (not shown).

The traveling carriage manager 3 allocates each of a plurality of the transport tasks to any of a set of the traveling carriages 2 which are managed. The transport tasks are supplied from a production manager, etc. of the upper layer (not shown) to the traveling carriage manager 3. Then, the traveling carriage manager 3 determines a traveling schedule corresponding to the allocated transport task.

With respect to the transport task, the traveling carriage manager 3 determines a traveling schedule in which the traveling carriage 2 will travel from the departure position to the designated loading position P1 and a traveling schedule in which it will travel from the designated loading position P1 (departure point) to the designated unloading position P2 (arrival point), respectively.

Here, the departure position is the current position of the traveling carriage 2 at a task start time which is pre-specified. As the task start time, for example, a time in which the traveling carriage 2 receives the transport task from the traveling carriage manager 3 can be set. However, this is not limiting. The task start time can be set to any time after receiving the transport task.

The traveling carriage manager 3 stores a route graph (a first graph) generated in advance. The prepared route graph is an abstraction of routes that the traveling carriage 2 can travel and is represented as a graph. The route graph includes a set of point nodes and inter-point edges. Each of the inter-point edges connects between the point nodes. By the route graph, it is possible to search one or multiple routes for travel from one point to another point. The departure position, the designated loading position P1 and the designated unloading position P2 of the traveling carriage 2 are all specified in the form of the point node in the route graph.

Real points indicated by a set of the point nodes are located side by side on the rails 4 with distance intervals corresponding to travel distance of per unit time of the traveling carriage 2, for example. However, this is not limiting. The point node may be set to indicate, for example, a position of each of the respective processing devices 1. The real points indicated by a set of the point nodes do not have to be set at equal intervals. The real points can be set at non-equal intervals depending on the acceleration/deceleration of the traveling carriage 2. The points are preferably defined by intervals corresponding to unit time because it facilitates computation of the state transition cost to be described later.

Each of the inter-point edges has information of a travel cost. In the route graph, each of the travel costs is defined as a time required for the traveling carriage 2 to travel from one point node to another point node among the point nodes connected by the inter-point edges. By using information of the travel cost, it is possible to obtain a time required for travel from one point to another point by computation.

Figure 3:
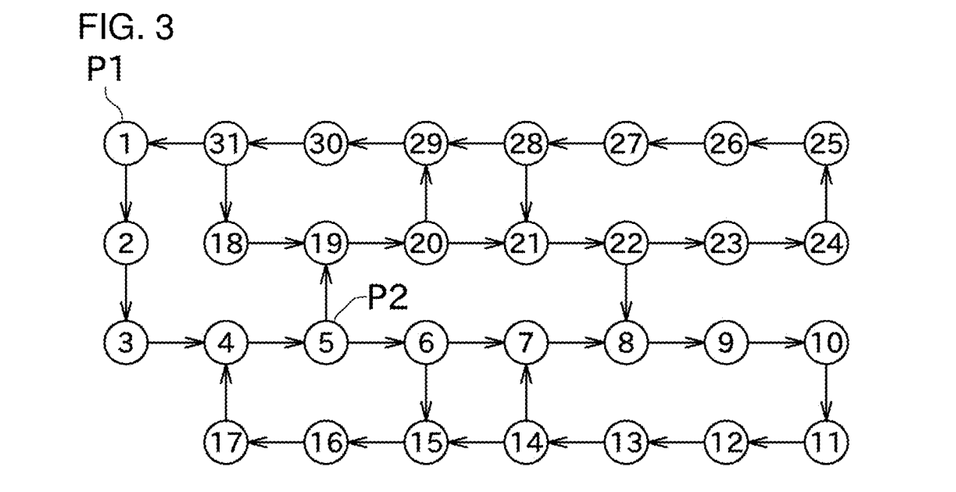
FIG. 3 is a diagram showing an example of a route graph.

FIG. 3 shows an example of the route graph. In FIG. 3, the point node is depicted as a circled numeral. The numeral indicates a number that uniquely identifies the point node. In the following, the circled numeral indicating the point node may be represented by a parenthesized number, for example, point node (1). Each of inter-point edges is represented as an arrow connecting two point nodes.

In this preferred embodiment, the route graph is represented as a directed graph because the routes of rails 4 are one-way. If a double-sided passage of rails 4 is available, the route graph can also be represented by an undirected graph.

In the following, as an example, the case where the point node (20) shown in FIG. 3 is the departure position of the traveling carriage 2, the point node (1) is the designated loading position P1, and the point node (5) is the designated unloading position P2 will be described.

The traveling carriage manager 3 first determines a traveling schedule from the departure position to the designated loading position P1 such that the traveling carriage 2 arrives from a departure position to the designated loading position P1 in the shortest time. The traveling schedule can be obtained, for example, by computation of the shortest path from the point node (20) of the departure position to the point node (1) of the designated loading position P1 by the Dijkstra's algorithm or A* algorithms or the like in the route graph.

The Dijkstra's algorithm is a shortest path finding method. In the Dijkstra's algorithm, the shortest path to each of the point nodes is determined one by one from the point node (20) as a starting point towards the periphery, and a search range is gradually expanded to the point node (1) as an ending point. Since the Dijkstra algorithm is well known, detailed descriptions thereof are omitted.

Next, the traveling carriage manager 3 uses a traveling schedule determination method (a routing determination method) to determine a traveling schedule for the traveling carriage 2 to travel from the designated loading position P1 to the designated unloading position P2. The traveling schedule determination method of this preferred embodiment can determine a traveling schedule of the traveling carriage 2 such that the traveling carriage 2 arrives at the designated unloading position P2 just in time for the second designated time $T_{set}$. That is, it is possible to determine a traveling schedule considering the JIT performance.

In the transport task allocated to the traveling carriage 2, the point node representing the designated loading position P1, which is a departure point node, and the point node representing the designated unloading position P2, which is an arrival point node, are arbitrarily selected. In the following, as an example, a case where the departure point node is designated in the point node (1) of FIG. 3 and the arrival point node is designated in the point node (5) of FIG. 3 will be described.

The traveling carriage manager 3 generates a time-space network (a second graph) to obtain a minimum cost transition path (a minimum cost path) described later. The time-space network compositely represents a position and a timing of the traveling carriage 2.

Figure 4:
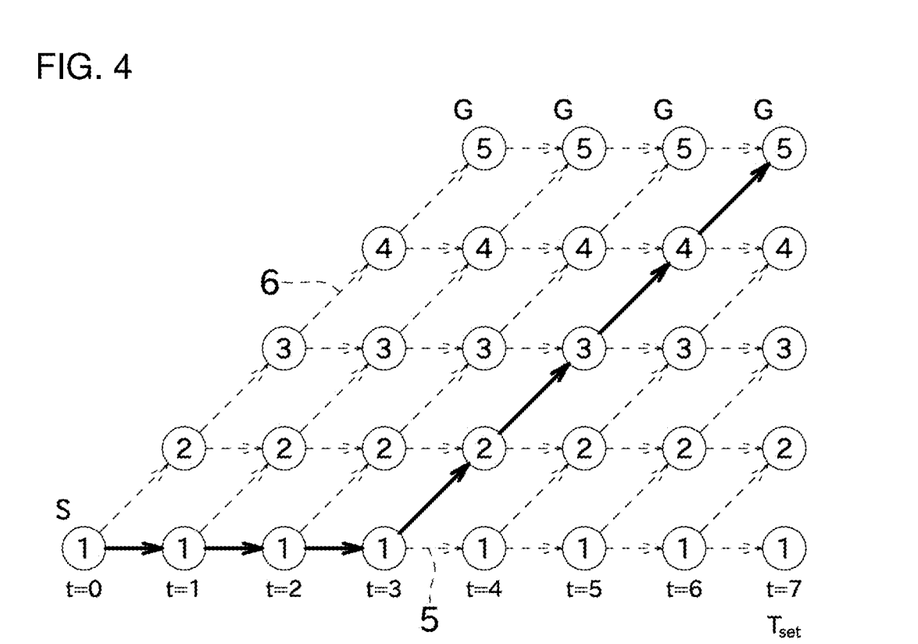
FIG. 4 is a diagram showing a time-space network and showing a minimum cost transition path for arriving at a designated unloading position at a second designated time.

The time-space network includes, as shown in FIG. 4, for example, a set of state nodes and a set of state transition edges. The state node is represented by a circle in FIG. 4. The state node represents a state that the traveling carriage 2 is present at a certain point node at a certain time. In FIG. 4, a numeral in the circle indicates the number of the point node. In FIG. 4, the positions of the state nodes (circles) are arranged in such a way that the older the corresponding time is, the more to the left it is positioned, and the newer the corresponding time the more to the right it is positioned.

Each of the state nodes represents a combination of the position of the traveling carriage 2 and the time. For example, the eight state nodes in the bottom row of FIG. 4 represent each of the states in which the traveling carriage 2 is present at the point node (1) at each time.

Each of the state transition edges connects between the state nodes. The state transition edge indicates that the state of traveling carriage 2 can transition from a state node connected prior to the state transition edge to a state node connected after the state transition edge.

In the time-space network, the state transition edges include a carriage staying edge (a vehicle staying edge) 5 and a carriage traveling edge (a vehicle traveling edge) 6 shown in FIG. 4.

The carriage staying edge 5 is an edge connecting two state nodes. The two state nodes indicate the same point node and the two times at which they are different by a unit time. In FIG. 4, the carriage staying edge 5 is represented by a horizontal arrow.

The carriage traveling edge 6 is an edge connecting two state nodes. The two state nodes indicate different point nodes and the two times at which they are different by a unit time. In FIG. 4, the carriage traveling edge 6 is represented by a diagonal arrow.

Time cannot be turned back. Thus, any state transition edge is represented as an arrow from the state node in which the time is the previous time to the state node in which the time is later time by a unit time. As a result, the time-space network is a directed graph.

The state node located at the bottom leftmost position in FIG. 4 represents a state that the traveling carriage 2 is present at the point node (1) at the departure time (e.g., time t=0). The departure time is a time at which the traveling carriage completes loading at the designated loading position P1 and departs from the designated loading position P1.

The time of t=0 may be referred to as a reference time in the following since it is used as a reference for time. In the following, in order to specify each of the state nodes, it may also be expressed as [t=0, n=1] for example, by using time t and the number n of the point node at which the traveling carriage 2 is present.

The state node [t=0, n=1], in other words, the bottom leftmost state node of FIG. 4, can be considered as the origin of various transitions of the state with respect to travel of the traveling carriage 2. Therefore, in the following, this state node is sometimes referred to as a starting point state node. The time-space network is generated to expand from the starting point state node as its origin.

The starting point state node represents the state of the traveling carriage 2 is present at the point node (1) at time t=0. There are two possible transitions from this state, the traveling carriage 2 stays at the point node (1) or travels to the point node (2).

If the traveling carriage 2 stays at the point node (1), the state transitions from the starting point state node [t=0, n=1] to the state node [t=1, n=1] along the carriage staying edge 5. The state node [t=1, n=1] indicates the state of the traveling carriage 2 is present at the point node (1) at a time of t=1.

If the traveling carriage 2 travels from the point node (1) to the point node (2), the state transitions from the starting point state node [t=0, n=1] to the state node [t=1, n=2] along the carriage traveling edge 6. The state node [t=1, n=2] indicates the state of the traveling carriage 2 is present at the point node (2) at a time of t=1.

Thus, each of the state transition edges represents a state transition associated with the passage of a unit time.

As shown in the route graph of FIG. 3, if the traveling carriage 2 travels from the point node (1), there is no other option but to go to the point node (2). Similarly, in each of the point nodes (2)-(4), there is only one option (one point node) of destination when the traveling carriage 2 is travel from the point node. Therefore, the time-space network in this case has a simple shape in which two branches consisting of one carriage traveling edge 6 and one carriage staying edge 5 are repeated, as shown in FIG. 4.

On the other hand, for example, if the traveling carriage 2 travels from the point node (22), any one of the point node (8) and the point node (23) can be selected as a destination. When the destination branches in this manner, a number of the carriage traveling edges 6 are generated in the time-space network according to the point nodes of destination. Therefore, the time-space network is more complex than the example shown in FIG. 4. Which point node the traveling carriage 2 can travel from the present point node can be easily obtained by referring to the route graph.

In generating the time-space network, the traveling carriage manager 3 calculates a state transition cost $d_{\sigma_a \sigma_b}$ at each of the state transition edges using the expression (1) below.

$$d_{\sigma_a \sigma_b} = \begin{cases} \alpha \max(0, T_{set} - t_{\sigma_b}) + \gamma \max(0, t_{\sigma_b} - T_{set}), & n_{\sigma_a} \neq n_{\sigma_b} \\ \beta t_{\sigma_b} + \gamma \max(0, t_{\sigma_b} - T_{set}), & n_{\sigma_a} = n_{\sigma_b} \end{cases} \quad (1)$$

Here, σ is the state node indicating the state in which the traveling carriage 2 is present at the point node (n) at time t. $n_\sigma$ is the number of the point node indicated by the state node. $t_\sigma$ is the time indicated by state node. $\sigma_a$ is the state node whose time is the older (before the transition) of the two state nodes connected by the state transition edge, and $\sigma_b$ is the state node whose time is the newer (after the transition). $T_{set}$ is a time (a second designated time) specified as the time to arrive at the designated unloading position P2. α is a first parameter related to an earliness cost, which will be described later. γ is a second parameter related to a tardiness cost, which will be described later. β is a third parameter related to a staying cost, which will be described later.

As shown in the expression (1) above, the state transition cost of each of the state transition edges is set according to a difference in the time $t_{\sigma_b}$ corresponding to after the transition indicated by the state transition edge and the second designated time $T_{set}$.

The upper expression of the expression (1) is used to calculate the state transition cost in the carriage traveling edge (a diagonal arrow in FIG. 4) included in the state transition edges.

The upper expression of the expression (1) contains the terms shown in the expression (2) and the expression (3) below.

$$\alpha \max(0, T_{set} - t_{\sigma_b}) \quad (2)$$

The term in the expression (2) is a term that calculates a cost (an earliness cost) for negatively evaluating that the timing of the traveling carriage 2 is too early. The earliness cost term is zero if time $t_{\sigma_b}$ when the traveling carriage 2 travels to any point node is after the second designated time $T_{set}$, otherwise it is positive. The earliness cost is calculated so that the earlier time $t_{\sigma_b}$ when the traveling carriage 2 travels in any point node is than the second designated time $T_{set}$, the higher it is. The first parameter α included in the expression (2) is for weighting and can be appropriately specified.

$$\gamma \max(0, t_{\sigma_b} - T_{set}) \quad (3)$$

The term in the expression (3) is a term that calculates a cost (a tardiness cost) for negatively evaluating that the timing of the traveling carriage 2 is too late. The tardiness cost term is zero if time $t_{\sigma_b}$ when the traveling carriage 2 travels to any point node is before the second designated time $T_{set}$, otherwise it is positive. The tardiness cost is calculated so that the later time $t_{\sigma_b}$ when the traveling carriage 2 travels in any point node is than the second designated time $T_{set}$, the higher it is. The second parameter γ included in the expression (3) is for weighting and can be appropriately specified.

The lower expression of the above expression (1) is used to calculate the state transition cost in the carriage staying edge 5 (a horizontal arrow in FIG. 4) included in the state transition edges.

The lower expression of the expression (1) contains the terms shown in the expression (4) below and the expression (3) above.

$$\beta t_{\sigma_b} \quad (4)$$

The term in the expression (4) is a term that calculates a cost (a staying cost) for negatively evaluating that a traveling carriage 2 is staying (in other words, the traveling carriage 2 does not contribute to transporting of the load). This term representing the staying cost is calculated so that when the traveling carriage 2 stays at any point node, the later time $t_{\sigma_b}$ at that timing, the higher it is. The staying cost encourages efficient use of the traveling carriage 2 for transporting a load. The third parameter included in the expression (4) is for weighting and can be appropriately specified.

If the traveling carriage 2 travels from one point node to another, the state transition cost associated with this state transition (the state transition represented by the carriage traveling edge 6) is a sum of the earliness cost and the tardiness cost. On the other hand, if the traveling carriage 2 stays at a certain point node, the state transition cost associated with this state transition (the state transition represented by the carriage staying edge 5) is a sum of the tardiness cost and the staying cost.

Comprehensively considering the above, when traveling from the designated loading position P1 to the designated unloading position P2, if it proceeds as shown in the thick arrow of FIG. 4, the tardiness cost can be zeroed and the staying cost and the earliness cost can be reduced. That is, the traveling carriage 2 does not travel much from the designated loading position P1 (the point node (1)) until a tight timing such that the arrival at the designated unloading position P2 (the point node (5)) is not late for the second designated time $T_{set}$. Then, the traveling carriage starts moving. The traveling carriage 2 arrives at the designated unloading position P2 exactly at the second designated time $T_{set}$.

Hereinafter, in the time-space network, the state node [t=0, n=1] may be referred to as a start state node. The state node [t=any, n=5] may be referred to as a goal state node.

The start state node is equal to the starting point state node. The start state node is a state node representing the state that the traveling carriage 2 is present at the designated loading position P1 at time t=0. The goal state node is a state node representing the state that the traveling carriage 2 is present at the designated unloading position P2 at any time t. In FIG. 4, the start state node is denoted by S and the goal state node is denoted by G. Each path from the start state node S to any of the goal state nodes G is a path that can realize transporting of the load from the designated loading position P1 to the designated unloading position P2, putting aside the timing.

In the traveling schedule determination method of this preferred embodiment, a path (minimum cost path) in which a sum of the state transition costs is minimum among paths from the start state node S to any of the goal state nodes G is obtained using the Dijkstra algorithm. Although it depends on the setting of the first parameter $\alpha$, the second parameter $\gamma$, and the third parameter $\beta$, the path shown in thick arrow in FIG. 4 is a path that is likely to be the minimum cost path.

By appropriately setting each of the first parameter $\alpha$, the second parameter $\gamma$, and the third parameter $\beta$, the traveling schedule determination method of this preferred embodiment can determine a traveling schedule suitable only for the JIT performance or a traveling schedule suitable only for transport efficiency (i.e., a total completion time required for automatic travel corresponding to a certain transport task). Further, the method can determine an optimum traveling schedule considering both the JIT performance and transport efficiency (the total completion time) with different weights. For example, by setting the second parameter $\gamma$ to be larger than the first parameter $\alpha$ and the third parameter $\beta$, the traveling schedule determined emphasizes avoiding delay in the arrival of the load.

Figure 5:
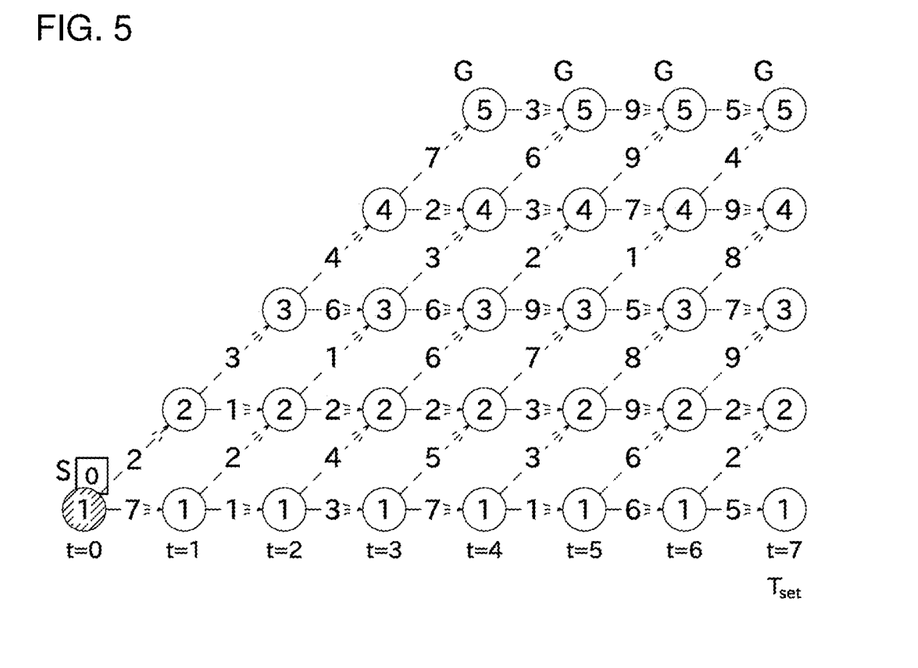
FIG. 5 is a diagram showing a state that a starting point state node is set to a fixed node in the initial step for computing a minimum cost transition path by the Dijkstra algorithm.

Next, a method of obtaining the above-mentioned minimum cost transition path by the Dijkstra algorithm will be described in detail. The method includes an initial step and an iteration. In the following, as an example, the case where each of the state transition costs is defined as indicated by a number in the respective arrow in FIG. 5 will be described. To avoid the complexity of the description, the state transition costs shown in FIG. 5 are simple integer values for the only explanation which does not comply with the expression (1) above.

In the initial step, with respect to the time-space network created as described above, the traveling carriage manager 3 sets the starting point state node (the state node [t=0, n=1]) to a fixed node. Further, the traveling carriage manager 3 sets a fixed cost of the starting point state node to a predetermined value (e.g., 0). This state is shown in FIG. 5. In FIG. 5 and subsequent figures, the fixed node is indicated by hatching, and the fixed cost is indicated as a square-shaped numerical value.

After performing the initial step as described above, the traveling carriage manager 3 performs an iteration including a first step, a second step, a third step, and a fourth step below.

When the iteration is started, the traveling carriage manager 3 determines neighbor state nodes (the first step). The neighbor state node is the state node which is not the fixed node, is adjacent to the fixed node, and is connected to the fixed node by the state transition edge.

In the state of FIG. 5, there is only one fixed node, i.e., [t=0, n=1]. Thus, when the first step is performed at this state, the neighbor state nodes are the two state nodes, i.e., [t=1, n=1] and [t=1, n=2].

Then, in the neighbor state nodes determined, the traveling carriage manager 3 obtains state transition cost cumulative values reaching the neighbor state nodes each of which is adjacent to a new-fixed node and is connected to the new-fixed node by the state transition edge (the second step). The new-fixed node is a node which has become the fixed node newly in the previous iteration (in the first iteration, has become the fixed node in the initial step).

In the second step, the traveling carriage manager 3 obtains the state transition cost cumulative value to each of the neighbor state nodes which has become subject as described above. The state transition cost cumulative value is obtained by adding the state transition cost (cost) in the state transition edge connecting the new-fixed node and the neighbor state node to the fixed cost in the new-fixed node.

Figure 6:
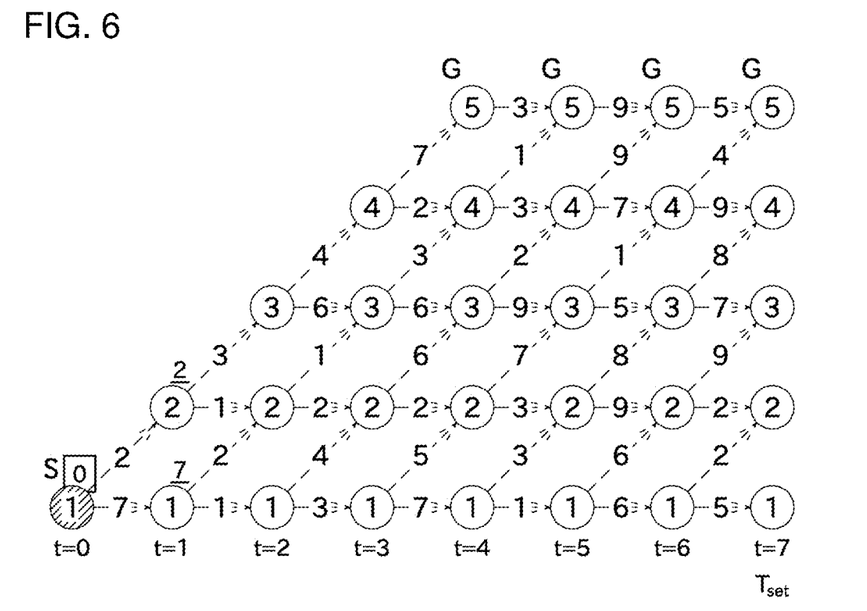
FIG. 6 is a diagram showing a situation that state transition cost cumulative values of neighbor state nodes are obtained from the state of FIG. 5.

The results of the second step are shown in FIG. 6. The fixed cost of new-fixed node [t=0, n=1] is 0. Therefore, the state transition cost cumulative value of the neighbor state node [t=1, n=1] is 0 plus the state transition cost 7, resulting in 7. The state transition cost cumulative value of the neighbor state node [t=1, n=2] is 0 plus the state transition cost 2, resulting in 2. The state transition cost cumulative values are shown in the underlined number in FIG. 6.

Next, for each of the neighbor state nodes, the traveling carriage manager 3 obtains a state transition cost cumulative best value (the third step). The state transition cost cumulative best value is a state transition cost cumulative value that is best (value is minimum) among the state transition cost cumulative values obtained by the second step in the iteration from the first time to this time.

In the state of FIG. 6, the state transition cost cumulative value of neighbor state node [t=1, n=1] is 7. Since it is a first time iteration, for the neighbor state node, this state transition cost cumulative value is minimum. Therefore, the state transition cost cumulative best value of the neighbor state node is 7. Regarding the neighbor state node [t=1, n=2], considering similarly as above, the state transition cost cumulative best value is 2.

Next, the traveling carriage manager 3 sets the neighbor state node with the smallest state transition cost cumulative best value obtained as above among the neighbor state nodes to a fixed node, and sets the state transition cost cumulative best value of the neighbor state node as its fixed cost (the fourth step).

Figure 7:
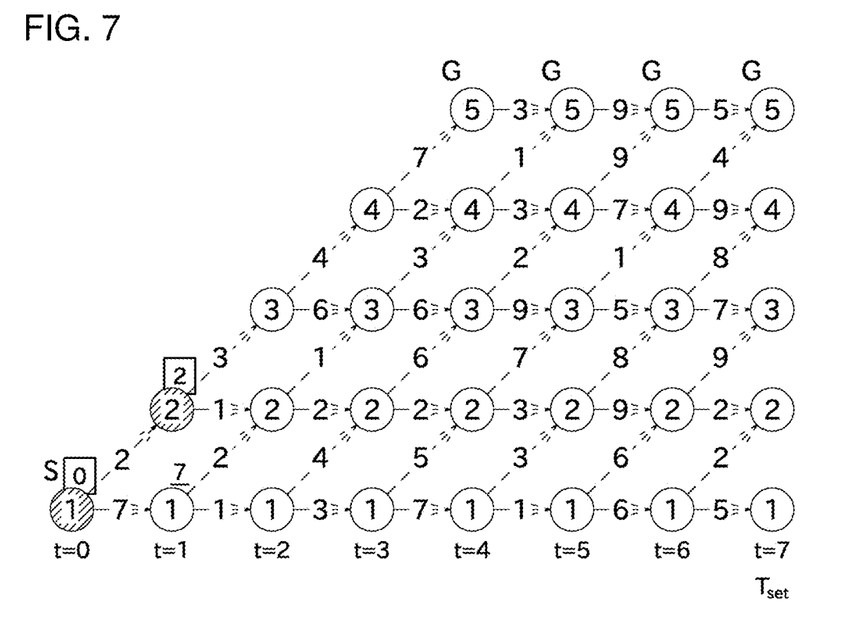
FIG. 7 is a diagram showing a situation that fixed nodes and fixed costs are obtained from the state of FIG. 6.

The results of the fourth step are shown in FIG. 7. The state transition cost cumulative best value, which is minimum, is 2. Therefore, the state node [t=1, n=2] newly becomes the fixed node, and its fixed cost is set to 2.

The traveling carriage manager 3 sequentially obtains the fixed node and the fixed cost one by one by repeating the iteration.

Figure 8:
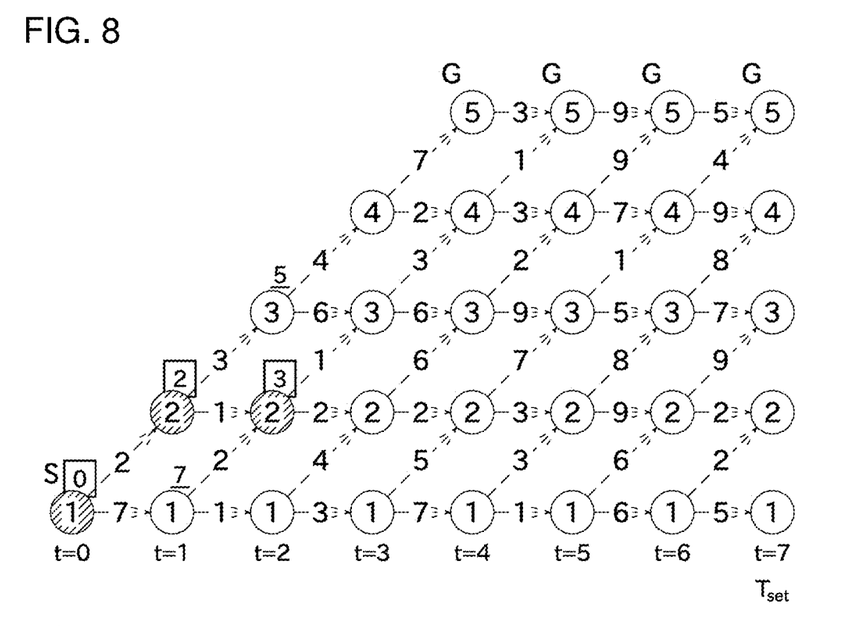
FIG. 8 is a diagram showing a situation that fixed nodes and fixed costs are further obtained from the state of FIG. 7.

From the state of FIG. 7, the results of the second step, the third step, and the fourth step executed again are shown in FIG. 8. In the state of FIG. 7, the neighbor state node is three nodes, i.e., [t=1, n=1], [t=2, n=2], and [t=2, n=3]. The state transition cost cumulative value for each of the neighbor state nodes is 7 for [t=1, n=1], 3 for [t=2, n=2], and 5 for [t=2, n=3]. These values are set as they are as the state transition cost cumulative best values. Therefore, as shown in FIG. 8, the state node [t=2, n=2] newly becomes a fixed node, and its fixed cost is set to 3.

In this way, the Dijkstra algorithm performs the shortest path search, which sequentially determines one by one from the periphery of the start state node and incrementally expands the range to the goal state node.

Figure 9:
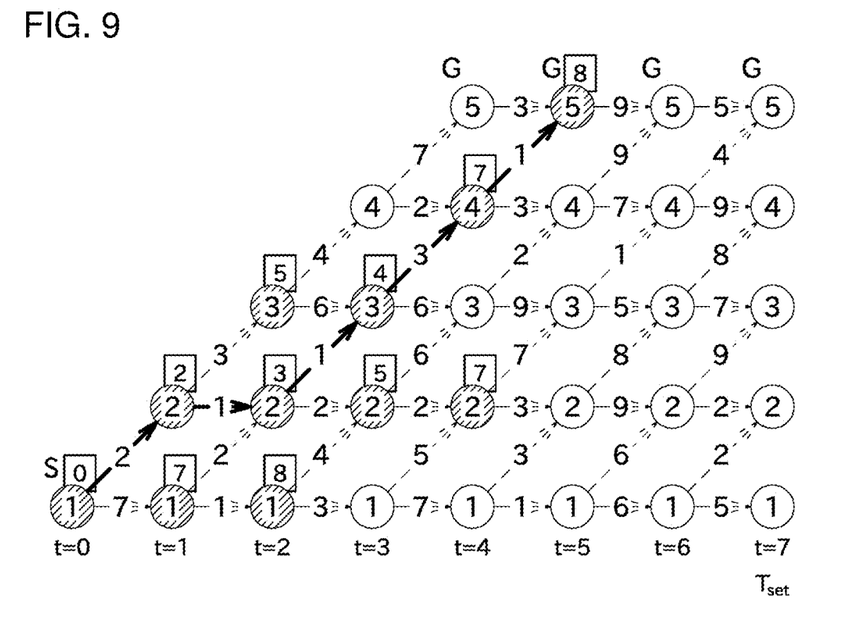
FIG. 9 is a diagram showing a state that a minimum cost transition path is obtained by the Dijkstra algorithm.

By repeating the above iteration, eventually, one of a set of the goal state nodes becomes a fixed node, as shown by the state node [t=5, n=5] in FIG. 9. As described above, the state nodes are determined in order of their smaller state transition cost cumulative best value. In other words, the best is preferentially searched. Therefore, at this timing shown in FIG. 9, the path reaching the fixed node [t=5, n=5] is the minimum cost transition path. Thus, the minimum cost transition path in the time-space network of FIG. 5 can be determined as a path shown as thick arrows of FIG. 9.

The traveling carriage manager 3 determines a traveling schedule based on the minimum cost transition path obtained. The traveling schedule includes a route along which the traveling carriage 2 travels (i.e., the point node indicated by each of the state nodes included in the minimum cost transition path) and a timing (i.e., time at which the traveling carriage 2 is present at each position).

Next, the traveling carriage manager 3 determines a traveling schedule for each of the traveling carriages 2 which is a subject to which the transport task is allocated, as described above. Then, the traveling carriage manager 3 checks whether or not the traveling carriages 2 interfere with each other when each of the traveling carriages 2 performs automatic travel according to the traveling schedule.

If a collision (interference) between the different traveling carriages 2 traveling according to the traveling schedule determined as described above has occurred, the traveling carriage manager 3 changes the determined traveling schedule for the traveling carriage 2 selected randomly among the traveling carriages 2 involved in the collision.

Figure 10:
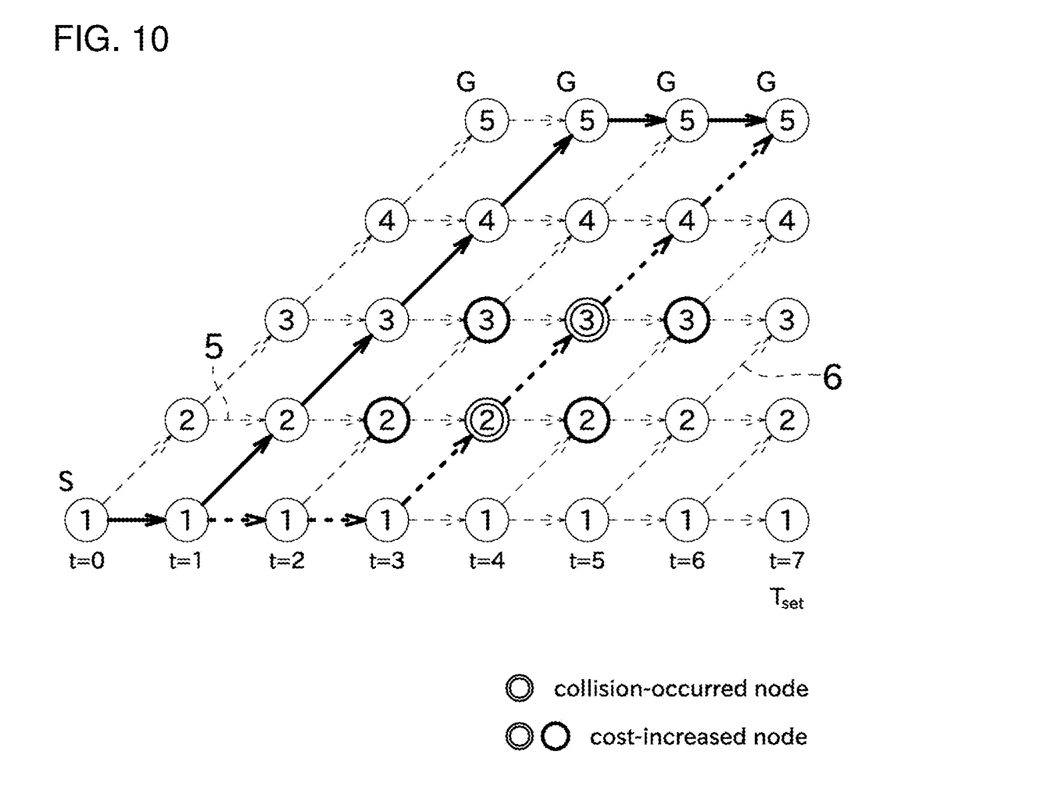
FIG. 10 is a diagram showing an avoidance route obtained by re-computation after increasing a state transition cost to avoid collision.

For example, as shown in FIG. 10, consider the case where, in the minimum cost transition path (the path shown in thick dotted line) determined for a certain traveling carriage 2, it is determined that the traveling carriage 2 collides with another traveling carriage 2 at state node [t=4, n=2], and state node [t=5, n=3], shown in the double circle of FIG. 10.

In this case, the traveling carriage manager 3 increases the state transition cost that transitions to each of the state nodes (double circles in FIG. 10) in which the collision is detected. Further, the traveling carriage manager 3 increases the state transition cost that transitions to the state nodes (circle in bold line in FIG. 10) whose the point node is same as the point node of the collision state node but the time differs by a unit of time. The cost increase means a penalty to prevent collisions.

Then, the traveling carriage manager 3 re-obtains the minimum cost transition path in the time-space network where the state transition costs are changed as described above. The minimum cost transition path newly obtained, as shown by the solid thick arrows in FIG. 10, can avoid collisions with other traveling carriage 2.

Thus, the traveling carriage manager 3 can efficiently determine the traveling schedule of the traveling carriage 2 to be allocated for each of the transport tasks so that the traveling carriages 2 do not interfere with each other when they perform automatic travel.

As described above, in the traveling schedule determination method of this preferred embodiment, the route and the timing of the traveling carriage 2 which performs automatic travel are determined. In the determination method, the route graph is prepared. The route graph represents the routes along which the traveling carriage 2 can travel. The route graph includes a set of point nodes, and inter-point edges each of which connects between the point nodes. Each of the point node (1), which is the departure point of the traveling carriage 2, and the point node (5), which is the arrival point of the traveling carriage 2, can be selected from the point nodes in the route graph. The departure time, at which the traveling carriage 2 is to depart from the point node (1), and the arrival time, at which the traveling carriage 2 is to arrive at the point node (5), are designated, respectively. In this case, in the traveling schedule determination method, the time-space network is generated. The time-space network represents a procedure for the traveling carriage 2 traveling from the point node (1) to the point node (5). The time-space network includes a set of the state nodes, and a set of the state transition edges each of is connected between the state nodes. Each of the state nodes represents a state in which the traveling carriage 2 is present at a certain point node at a certain time. Each of the state transition edges is connected between the state nodes. The state transition edges include the carriage staying edge 5 and the carriage traveling edge 6. The carriage staying edge 5 represents a case where the traveling carriage 2 at a certain point node present at a certain time stays at the certain point node until the following time. The carriage traveling edge 6 represents a case where the traveling carriage 2 present at a certain point node at a certain time travels to each of other point nodes connected to the certain point node via the inter-point edges at a later time. The carriage traveling edge 6 is defined for each of the point nodes of destination. It is presupposed that the state node representing a state in which the traveling carriage 2 is present at the point node (1) at the reference time (time t=0) is called the starting point state node, the time-space network is generated originating from the starting point state node. In each of the state transition edges, a state transition cost is defined. The state transition cost increases according to a difference of a time $t_{ob}$ corresponding to after transition indicated by the state transition edge and the second designated time $T_{set}$. In the time-space network, by using the Dijkstra algorithm, the minimum cost transition path is obtained. The minimum cost transition path is a path in which a sum of the state transition costs is minimum among paths from the starting point state node to any of the state nodes indicating that the traveling carriage 2 is present at the point node (5). The route and the timing of the traveling carriage 2 are determined based on the minimum cost transition path.

As a result, it is possible to obtain efficiently the minimum cost transition path for travel of the traveling carriage from the specified designated loading position P1 to the designated unloading position P2. Additionally, the state transition cost in the state transition edge is set according to a difference of a time $t_{ob}$ after the transition indicated by the edge and the specified second designated time $T_{set}$. Therefore, it is possible to generate the minimum cost transition path considering the JIT performance so that the traveling carriage 2 arrives at the designated unloading position P2 at the second designated time $T_{set}$.

Further, in the traveling schedule determination method of this preferred embodiment, the third parameter β can be set larger than the first parameter α. In this case, the state transition cost is set to be larger, when the time $t_{ob}$ corresponding to after the transition indicated by the corresponding state transition edge is later than the second designated time $T_{set}$, than when it is earlier, even if a time difference is the same.

As a result, it is possible to greatly reduce the possibility that a path to arrive at the designated unloading position P2 at a time later than the second designated time $T_{set}$ is determined as the minimum cost transition path.

Further, in the traveling schedule determination method of this preferred embodiment, the state transition cost is obtained based on the earliness cost, the tardiness cost, and the staying cost. The earliness cost is added if the time $t_{ob}$ corresponding to after the transition indicated by the corresponding state transition edge is earlier than the second designated time $T_{set}$. The tardiness cost is added if the time $t_{ob}$ corresponding to after the transition indicated by the corresponding state transition edge is later than the second designated time $T_{set}$. The staying cost is added when the traveling carriage 2 stays at any of the point nodes. Each of the first parameter α for weighting of the earliness cost, the second parameter γ for weighting of the tardiness cost, and the third parameter β for weighting of the staying cost can be specified.

By appropriately specifying the first parameter α, the second parameter γ, and the third parameter β, it is possible to determine a traveling schedule corresponding to the degree of importance with respect to the JIT performance and the transport efficiency respectively.

Further, in the traveling schedule determination method of this preferred embodiment, a distance between real points represented by the point nodes corresponds to a travel distance of per unit time of the traveling carriage 2.

As a result, the computation of the state transition cost can be facilitated.

Further, in the traveling schedule determination method of this preferred embodiment, the route and the timing are simultaneously (provisionally) determined by obtaining the minimum cost transition path for each of a set of the traveling carriages 2 in which each of the departure point node, the arrival point node, the departure time, and the second designated time $T_{set}$ is designated. If interference occurs between the traveling carriages 2 in a case where each of the traveling carriages 2 travels in accordance with the route and the timing are determined, the route and the timing are determined again by re-obtaining the minimum cost transition path. The minimum cost transition path is re-obtained after increasing the state transition cost of the state transition edge corresponding to the interference with the other traveling carriage 2 for at least one of the interfering traveling carriages 2.

As a result, the collision avoidance can be easily determined while considering the JIT performance.

Further, in the traveling schedule determination method of this preferred embodiment, for obtaining the minimum cost transition path, the iteration is repeated after the initial step. In the initial step, in the time-space network, the starting point state node is set to the fixed node and the fixed cost of the starting point state node is set to a predetermined value. The iteration includes the first step, the second step, the third step, and the fourth step. In the first step, the neighbor state nodes are obtained. Each of the neighbor state nodes is a state node which is not set to a fixed node, is adjacent to any fixed node, and is connected to the fixed node via the state transition edge. In the second step, with respect to specific neighbor state nodes, the state transition cost cumulative values for reaching the neighbor state nodes are obtained. The specific neighbor state nodes are neighbor state nodes each of which is adjacent to a new-fixed node and is connected to the new-fixed node via the state transition edge. The new-fixed node is a node which has become the fixed node newly in the initial step or in the previous iteration. The state transition cost cumulative value is obtained by adding the cost of the state transition edge to the fixed cost of the new-fixed node. In the third step, with respect to each of the neighbor state nodes, the state transition cost cumulative best value is obtained. The state transition cost cumulative best value is the state transition cost cumulative value that is best among the state transition cost cumulative values obtained by the second step in the iteration from the first time to the present. In the fourth step, the neighbor state node with the smallest state transition cost cumulative best value obtained by the third step is set to the fixed node, and the state transition cost cumulative best value is set to the fixed cost of the fixed node. In the method of determining the minimum cost transition path, the fixed node and the fixed cost are sequentially obtained by repeating the iteration. A path in which the fixed cost is the smallest among the paths reaching the state node indicating that the traveling carriage 2 is present at the point node (5) is obtained as the minimum cost transition path.

As a result, the minimum cost transition path can be searched efficiently. Additionally, for example, a traveling schedule that takes into account the balance between just-in-time performance and the total completion time, which are usually in a trade-off relationship, can be determined.

While some preferred embodiments of the present invention have been described above, the above configurations may be modified, for example, as follows.

As the time used for the computation of the state transition cost, instead of the time $t_{ob}$ corresponding to after the transition indicated by the corresponding state transition edge, the time $t_{oa}$ corresponding to before the transition may be used.

A traveling schedule in which the traveling carriage 2 travels from the departure position to the designated loading position P1 may be determined as the traveling schedule for traveling from the designated loading position P1 to the designated unloading position P2. That is, the traveling schedule determination method of the above-described preferred embodiment about the traveling schedule for the traveling carriage 2 from the designated loading position P1 to the designated unloading position P2 may be similarly applied with respect to the traveling schedule for the traveling carriage 2 from the departure position to the designated loading position P1. In this case, the JIT performance for arrival at the designated loading position P1 is also considered.

After completion of the transport task, the traveling carriage 2 may stay at a current position, may stay at a pre-specified standby position, or may wait with traveling along a pre-specified standby route. From the viewpoint of ease of traveling schedule generation, it is preferable that the traveling carriage 2 after completing the transport task stays at a position and waits.

The traveling carriage 2, instead of magnetic tape, may travel along a travel line which is configured from other materials, or may perform automatic travel without a travel line formed from tape or the like.

The traveling carriage 2 is not limited to an unmanned carrier vehicle such as AGV. For example, a rail unmanned carrier vehicle (RGV; Rail Guided Vehicle), or an overhead traveling vehicle (OHS; Over Head Shuttle) or the like can be used.

A transport area of the traveling carriage 2 may be pre-specified. In this case, the traveling carriage 2 may wait at a position where the transport task has been completed, or may wait at a standby position pre-specified in the transport area. The traveling carriage manager 3 may be provided for each area.

In addition to the transport system 100, a traveling schedule determination method of a preferred embodiment of the present invention can also be applied to other routing system having a set of vehicles (e.g., automated driving of a vehicle).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A routing determination method of routing for automated guided vehicles for determining a route and timing of a vehicle which performs automatic travel, the method comprising:
   a) preparing a first graph that represents routes along which the vehicle can travel, the first graph including a set of point node, and inter-point edges each of which connects between the point nodes so that each of a departure point node, which is a departure point of the vehicle, and an arrival point node, which is an arrival point of the vehicle, are able to be selected from the point nodes in the first graph;
   b) generating a second graph that represents a procedure of the vehicle traveling from the departure point node to the arrival point node when a departure time at which the vehicle is to depart from the departure point node and an arrival time at which the vehicle is to arrive at the arrival point node are designated, respectively; wherein
   the second graph includes:
   a set of state nodes each of which represents a state in which the vehicle is present at a certain point node at a certain time; and
   a set of state transition edges each of which connects between the state nodes, the state transition edges including:
      a vehicle staying edge representing that the vehicle present at a certain point node at a certain time stays at the certain point node until a later time; and
      a vehicle traveling edge representing that the vehicle present at a certain point node at a certain time travels to each of the other point nodes connected to the certain point node via the inter-point edge at a later time, the vehicle traveling edge being defined for each of the point nodes of destination;
   presupposing that the state node representing a state in which the vehicle is present at the departure point node at a reference time is called a starting point state node, the second graph being generated originating from the starting point state node;
   c) defining a state transition cost that increases according to a difference of time corresponding to before or after a transition indicated by the state transition edge and the arrival time in each of the state transition edges;
   d) obtaining a minimum cost path in which a sum of the state transition costs is minimum among paths in the second graph from the starting point state node to any of the state nodes indicating that the vehicle is present at the arrival point node by using the Dijkstra algorithm; and
   e) determining the route and the timing of the vehicle based on the minimum cost path.

2. The routing determination method according to claim 1, wherein the state transition cost is set to be larger when the time corresponding to before or after the transition indicated by the state transition edge is later than the arrival time, than when it is earlier, even if a time difference is the same.

3. The routing determination method according to claim 1, wherein the state transition cost is obtained based on:
   an earliness cost being added if the time corresponding to before or after the transition indicated by the corresponding state transition edge is earlier than the arrival time;
   a tardiness cost being added if the time corresponding to before or after the transition indicated by the corresponding state transition edge is later than the arrival time; and
   a staying cost being added when the vehicle stays at any of the point nodes; and
   each of a first parameter for weighting the earliness cost, a second parameter for weighting the tardiness cost, and a third parameter for weighting the staying cost are able to be specified.

4. The routing determination method according to claim 1, wherein a distance between real points represented by the point nodes corresponds to a travel distance of per unit time of the vehicle.

5. The routing determination method according to claim 1, wherein
   the route and the timing are simultaneously determined by obtaining the minimum cost path for each of a set of the vehicles in which each of the departure point node, the arrival point node, the departure time, and the arrival time is designated; and
   if interference occurs between the vehicles in a case where each of the vehicles travels in accordance with the route and the timing determined, the route and the timing are determined again by re-obtaining the minimum cost path after increasing the state transition cost of the state transition edge corresponding to the interference with the other vehicle for at least one of the interfering vehicles.

6. The routing determination method according to claim 1, wherein
   in a method for obtaining the minimum cost path, an iteration is repeated after an initial step in which the starting point state node in the second graph is set to a fixed node and a fixed cost of the starting point state node is set to a predetermined value,
   the iteration includes:
      a first step of obtaining neighbor state nodes each being not set to the fixed node, adjacent to any fixed node, and connected to the fixed node via the state transition edge;
      a second step of obtaining state transition cost cumulative values for reaching the neighbor state nodes, each of which is adjacent to a new-fixed node which has become the fixed node newly in the initial step or in the previous iteration, and is connected to the new-fixed node, by adding the cost of the state transition edge to the fixed cost of the new-fixed node;
      a third step of obtaining, with respect to each of the neighbor state nodes, a state transition cost cumulative best value which is the state transition cost cumulative value that is best among the state transition cost cumulative values obtained by the second step in the iteration from first time to the present; and
      a fourth step of setting the neighbor state node with the smallest state transition cost cumulative best value obtained by the third step to the fixed node, and setting the state transition cost cumulative best value to the fixed cost of the fixed node;
   the fixed node and the fixed cost are sequentially obtained by repeating the iteration; and
   a path in which the fixed cost is smallest among the paths reaching the state node indicating that the vehicle is present at the arrival point node is obtained as the minimum cost path.

7. A controller for determining the route and the timing of the vehicle using the routing determination method according to claim 1.

8. A traveling system comprising:
   the controller according to claim 7; and
   a plurality of traveling devices to perform automatic travel according to the route and the timing determined by the controller.

\* \* \* \* \*